United States Patent [19]
Cook

[11] Patent Number: 5,859,527
[45] Date of Patent: Jan. 12, 1999

[54] ELECTRICAL SIGNAL SUPPLY WITH SEPARATE VOLTAGE AND CURRENT CONTROL FOR AN ELECTRICAL LOAD

[75] Inventor: Alan Cook, Hallett Cove, Australia

[73] Assignee: Skop GmbH Ltd, Tortola, Virgin Islands (Br.)

[21] Appl. No.: 768,956

[22] Filed: Dec. 18, 1996

[30] Foreign Application Priority Data

Jun. 14, 1996 [AU] Australia ................................ PO 0445

[51] Int. Cl.⁶ ...................................................... G05F 1/12
[52] U.S. Cl. ......................... 323/298; 323/911; 323/285; 307/110; 607/116
[58] Field of Search ................................... 323/911, 298, 323/352, 364, 224, 285; 607/72, 116, 2

[56] References Cited

U.S. PATENT DOCUMENTS

| | | |
|---|---|---|
| 3,791,373 | 2/1974 | Winkler et al. ............................ 600/26 |
| 4,232,680 | 11/1980 | Hudleson et al. ....................... 128/422 |
| 4,442,397 | 4/1984 | Ishikawa et al. ........................ 323/275 |
| 4,632,117 | 12/1986 | James ........................................ 607/46 |
| 4,693,254 | 9/1987 | Mickiewicz et al. ................... 128/421 |
| 4,782,837 | 11/1988 | Hogan ..................................... 128/421 |
| 4,841,973 | 6/1989 | Stecker ..................................... 607/58 |
| 4,926,864 | 5/1990 | Dufresne et al. ......................... 607/72 |
| 5,218,960 | 6/1993 | Privas ....................................... 607/58 |

*Primary Examiner*—Shawn Riley
*Attorney, Agent, or Firm*—Watts, Hoffmann, Fisher & Heinke Co., L.P.A.

[57] ABSTRACT

An electrical signal supply apparatus independently controls and regulates voltage and current in supplying microampere currents to skin tissue of patients. The apparatus enables operators to select a desired voltage level independent of the requirement to maintain current through the skin tissue at a relatively constant level. The apparatus includes a switching regulator in combination with an electric voltage doubling network and potential divider network to enable the supply of increased voltages.

22 Claims, 2 Drawing Sheets

ELECTRICAL SIGNAL SUPPLY WITH SEPARATE VOLTAGE AND CURRENT CONTROL FOR AN ELECTRICAL LOAD

BACKGROUND OF THE INVENTION

This invention relates to a novel method and electrical signal supply means which provides a higher voltage level from a direct current source as compared with the prior art and regulates the voltage produced and the current applied to a load separately and independently. Whilst suited to many applications, this invention is particularly useful for the application of electrical signals to the tissue of living patients. The improvement in the supply of electrical signals in this invention is of particular significance to electrical skin rejuvenation techniques, transcutaneous electrical nerve stimulation and electrical anaestheseological techniques.

In applying electrical signals to the tissue of patients for any of the aforementioned purposes, there is a requirement for the application of electrical energy at relatively high voltage and relatively small current levels. In addition, regulation of voltage and current is an important factor in assuring the success of any treatment. The inventor has established that the independent control and regulation of voltage and current leads to a significant increase in the flexibility of control of the electrical signals applied to electrical loads as compared with the prior art.

Microampere currents passed through skin tissue appear to have beneficial effects in rejuvenating skin cells and promoting cell wall elasticity. After this type of treatment, improvements are observed in the form of improved skin tone, reduction in the appearance of skin blemishes and improved elasticity of the skin. In providing this type of treatment, specific current and voltage waveforms are required for the treatment of particular skin types and skin blemishes. Control of the signals applied to the tissue is important since the treatment varies for each individuals skin type and condition.

DESCRIPTION OF THE PRIOR ART

Prior art known to the applicant in this field consists primarily of devices which provide a relatively basic level of voltage regulation in order to provide a relatively constant current between application probes when brought into electrical contact with the skin of the individual being treated. The prior art generally employs conventional and well known electrical signal supply techniques in the provision of the required electrical signals at the probes of the treatment device and generally provides a voltage control means which is adjusted according to a semsed current. These prior art techniques generally control the current passing through the electrical load by controlling and adjusting the voltage applied to the electrical load.

Apparatus for the aforementioned types of treatment generally require a relatively high regulated direct current voltage to be produced from a relatively low voltage direct current source. The generation of the requisite electrical signals from batteries obviates the concerns regarding the possible electrocution of patients by connection of the apparatus to the main electrical supply. The generation of relatively high regulated direct current voltages from a low voltage source is generally achieved by the use of a switching regulator design. Various semiconductor manufacturers commercially provide integrated semiconductor devices specifically for this purpose. However, these devices are generally capable of providing direct current output voltages up to approximately forty eight volts without the use of additional transformation circuitry and current outputs up to approximately one hundred to two hundred milliamps. To obtain higher voltage levels, additional circuitry comprising a transformer is generally used. In addition, in order to adequately regulate voltage it is generally required that these type of circuits supply current in the order of several milliamps whilst many applications, and in particular the application of electrical signals to tissue for rejuvenation purposes, only require the supply of current in the order of one to two hundred microamperes. Use of a circuit that draws several milliamps can be used for the purpose of skin rejuvenation therapy by shunting the excess current supply and ensuring that the current supplied to the patient is of the appropriate magnitude. However, if this approach is adopted with a fixed energy store for the supply of electrical current, for example batteries, the effective running time for the device is significantly reduced as compared with a circuit that only draws the amount of current required.

An additional complication with the application of electrical signals to tissue for rejuvenation purposes is the requirement for the probes to be regularly relocated upon the skin of the individual during the treatment process This has the effect of rapidly and regularly altering the electrical load presented between the probes of the device. This complication is not as prevalent for transcutaneous electrical nerve stimulation and electrical anaestheseological techniques.

Prior art devices known to the applicant specifically for rejuvenation treatment suffer from the limitations previously described which results in inadequate voltage and current regulation of the signals between the probes of the treatment device. The prior art techniques generally employed to control the amount of current passing through an electrical load generally suffer from an inability to react quickly to changes in the impedance of the electrical load as presented to the signal supply apparatus. As a result, prior art devices used by the applicant have resulted in significant levels of discomfort experienced by individuals receiving treatment. In some cases, due to inadequate voltage regulation, relatively high voltages have been allowed to be generated across the probes with a subsequent stinging sensation being experienced by the individual receiving treatment. In addition, prior art devices known to the applicant have only been able to generate the high voltages required by the use of transformers. This significantly increases the cost, weight and bulk of the signal generating apparatus and reduces the effective running time for the apparatus thereby limiting the uses and applications of such equipment Transcutaneous electrical nerve stimulation is a well researched and documented field, where a pulsed frequency, at a pre-determined voltage is applied to the outer skin tissue of a patient, with the intention of blocking pain signals in the central nervous system. Such units are used extensively in medicine, sports medicine, physiotherapy, and to some extent experimentally during surgery. Prior art devices in this field known to the applicant have difficulty in achieving the optimal settings for each particular instance of use. The prior art devices generally rely on voltage regulation, and do not employ any form of voltage independent current regulation. Accordingly, these devices generally have a very limited range of adjustments.

Transcutaneous electrical nerve stimulation techniques also have application in the field of sports medicine for the temporary relief of pain without use of pain relieving drugs and for passive muscular exercise. Whilst requiring a higher level of current as compared with other applications, devices in this field directly trigger muscular contractions by electrical stimulation of the controlling nerves. Devices in this field generally enable an athlete to train through an injury that would normally cause them to miss training, and perhaps also miss an important competition, whereby training would not cause serious injury. It is a requirement for devices for this type of application to be tuned to the response characteristics of a specific nerve or group of nerves. Again, prior art devices in this field known to the applicant suffer from a lack of ability to adjust and control various variables to enable the devices to be specifically tuned to particular nerves or nerve groups.

BRIEF SUMMARY OF THE INVENTION

It is an object of this invention to provide an electrical signal generating apparatus wherein the current supplied to an electrical load is controlled and regulated independently from the control and regulation of the voltage supplied to the same electrical load.

It is another object of this invention to provide a method and electrical signal generating apparatus wherein the apparatus is capable of providing a regulated direct current voltage without the use of circuitry comprising a transformer, at voltage levels exceeding those of prior art devices that also do not comprise a transformer.

It is a further object of this invention to provide an electrical signal generating apparatus wherein the voltage and current supply is adjusted and controlled separately thereby enabling the production of desired waveforms for the voltage and current supplied to an electrical load.

In one embodiment of this invention, an electric signal generating apparatus is provided comprising independent means for voltage control and regulation and current control and regulation to a varying electrical load wherein a voltage is applied to said electrical load being electrically connected in series with said current control and regulation means which senses the electrical current passing through the current control and regulation means with said current control and regulation means capable of adjusting its electrical impedance to maintain a relatively constant electrical current passing through said electrical load and said current control and regulation means, said electrical signal supply apparatus characterised by control of the voltage to determine a desired voltage level to be applied to the varying electrical load being independent of the requirement to control the current passing through the varying electrical load.

In another aspect of this invention an electric signal generating apparatus comprises a voltage control and regulation means comprising a switching regulator characterised by the electrical connection of an electric voltage doubling network and an electric potential dividing network between said switching regulator oscillator output and the switching regulator voltage sample input terminal said electric potential dividing network further comprising a variable and controllable electrical impedance thereby forming means of controlling the output voltage of said voltage control and regulation means.

In one particular embodiment of this invention the applicant has provided a microprocessor controlled electrical signal supply apparatus which generates a regulated DC output between 25 volts and 160 volts with a source DC voltage between 5 volts to 9 volts without the use of a transformer circuit. The microprocessor is able to set the DC output voltage of the regulator, and is able to regulate the current passing through a load connected to the output of the apparatus.

In this particular embodiment of the invention an input voltage is applied to a circuit comprising a switch mode control circuit. The switch mode control circuit may be a proprietary device, such as the Motorola MC34063, or it may even be constructed from discrete components. This switch mode control circuit utilises an oscillator, timing circuits, current sensing circuits and a charge storage circuit to generate an output voltage the magnitude of which is proportional to the duty cycle of the oscillator circuit. The switch mode control circuit further comprises a comparator that is used to regulate the output voltage of the switch mode control circuit. Regulation of the output voltage is effected by sampling a portion of the output voltage and comparing this to a reference voltage. In the case of the MC34063 the reference voltage is 1.25 volts and the portion of the output voltage is derived using a voltage divider.

A voltage divider has two components, an upper resistance and a lower resistance. In this particular embodiment the lower resistance is composed of two parts. A fixed resistance, which is used to limit current, and to control the adjustment range of the voltage regulator, and a variable resistance, which is used to set the desired output voltage. It should be noted that the variable resistance may be a manually controlled potentiometer, a digital potentiometer or a voltage controlled difference amplifier. The choice of variable resistance means will depend upon whichever best suits a particular application. Once this variable resistance has been set the remaining circuitry will regulate the output voltage, despite fluctuations in the load and supply voltages, within designed limits of maximum current, and input voltages.

A voltage doubler is generally driven by an oscillator circuit. In a substantial number of situations a DC voltage is used to drive an oscillator circuit, which produces a square wave output, the peak magnitude of which is approximately equal to the supplied voltage. This square wave is then passed through a diode capacitor voltage doubler chain. At each stage of the chain the output voltage is equal to double the input voltage, less circuit losses, such as diode voltage drops. In this particular embodiment of the invention the switch mode regulators oscillation function is directly connected to the voltage doubler chain.

In this particular embodiment of the invention the output voltage is sampled after a current limiting resistor. The current limiting resistor restricts the maximum available current drawn from the power supply. The particular value of this current limiting resistor will depend upon the specific application. In this embodiment of the invention the current limiting resistor also serves as a filter, in combination with a capacitor. By sampling the output voltage after the current limiting resistor, the switch mode regulator device is regulating the actual voltage output of the entire circuit, making it unnecessary to compensate for circuit losses, which would be the case if the regulation sample was taken from the output of the regulator device.

The output from the power supply in this embodiment is applied to a pair of probes. These probes have a very high value resistance placed across them to enable a 'soft start' of the system, by enabling current flow, and current regulation to occur prior to completing the circuit through the probes. This lessens the effect of any current surges which may occur when an electrical resistance is initially placed across the probes.

This embodiment further comprises a current regulation circuit which comprises an amplifier, a regulation transistor, a voltage comparator, and a control signal. It should be noted that the control signal may be derived from a potentiometer, a digital to analogue converter or any other voltage source. In this embodiment of the invention a voltage range of zero to 2 volts gives a current set point range of zero to 640 microamps. The set point voltage is applied to the input of a differential amplifier. The output of this amplifier is the difference between the applied set point, and the voltage derived across a current sensing resistor connected to the emitter of the regulation transistor. This voltage may or may not be amplified.

Provision is made to sample both the voltage and current with a microcontroller which enables the circuit to be self-calibrating. The microcontroller reads the voltage at its input pin, compares this to the desired set point value, and can then adjust its control outputs to achieve the correct voltage or current.

The maximum voltage achievable is mainly limited by the selection of components, and can readily be adjusted to exceed 500 volts.

Since the circuit is able to vary and regulate both voltage and current, it is capable of generating complex waveforms. If simple current and voltage set points are used the output from the circuit will be a fixed voltage and current, the voltage being referenced to ground. More complex waveforms may be generated by varying the set points for voltage and current. For example, any DC based waveform from a single pulse to a pseudo sinusoidal waveform may be generated. With the use of additional circuitry it is possible to generate any waveform, for example a bipolar AC sinusoidal waveform or negative current or voltage waveform. The frequency of the waveforms is limited only by the speed of the control circuit and the discharge characteristics of the voltage doubler.

This invention allows many methods for implementing the control signal of the voltage and current regulation circuits. The voltage control operates independently of the current control except that there must be adequate voltage available for a given load to ensure adequate current in accordance with Ohm's law. Since the voltage and current supply circuits can be considered independently it is possible to use a different control method for each variable. Some of the possible control mechanisms include a simple potentiometer where a constant level is adequate, preset levels selected by a switching mechanism, an external modulation source, a digitally controlled potentiometer with manual interface, a digitally controlled potentiometer with microprocessor interface, an internal modulation source (for example an oscillator, envelope generator, voltage controlled oscillator or current controlled oscillator), a microprocessor based waveform synthesiser, a microprocessor based envelope synthesiser, internal feedback synthesis, a Bio-feedback mechanism, EEG controlled waveform and/or envelope synthesis or Digital to Analogue converter.

As a result of this invention, it is possible to provide an electrical signal generating apparatus that is smaller in physical size and lighter in weight as compared with prior art devices. This is of particular advantage in applications wherein the device is required to be worn by the user during some form of activity.

BRIEF DESCRIPTION OF THE DRAWINGS

Although the invention need not necessarily include the above mentioned details an embodiment is described hereunder in some further detail with reference to and is illustrated in the accompanying drawings, in which.

DETAILED DESCRIPTION OF THE PREFERRED EMBODIMENT

Figure 1:
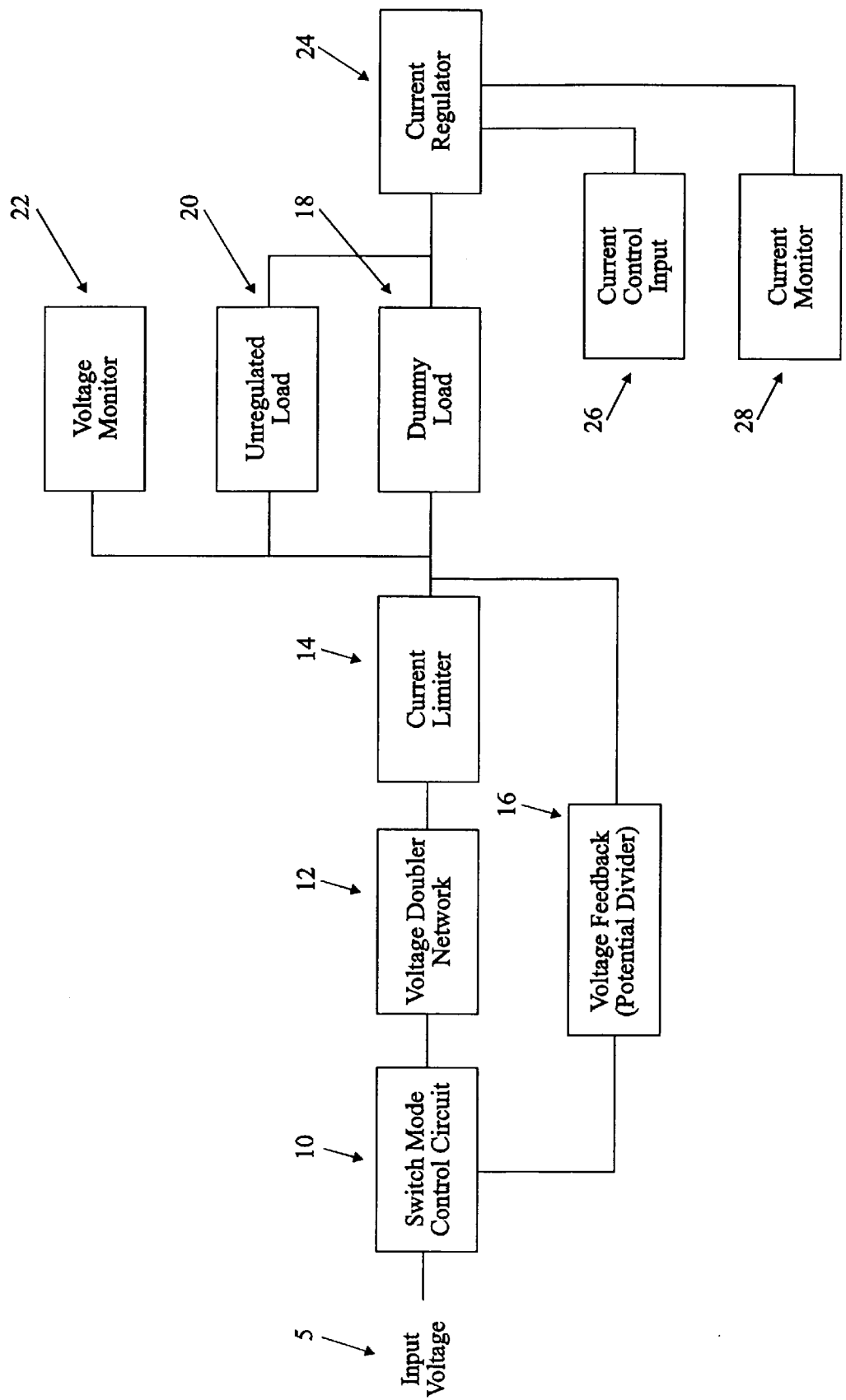
FIG. 1 is a block diagram illustrating the basic elements of the invention.

FIG. 1 details the basic elements of the invention in block diagram form An input voltage 5 comprising a direct current voltage source is applied to a switch mode control circuit 10. The output of the switch mode control circuit 10 is connected to a voltage doubling network 12 which in turn is connected to a current limiter 14. The output of the current limiter 14 comprises the regulated voltage of the apparatus which is fed back to the switch mode control circuit 10 through the voltage feedback (potential divider) 16. The regulated voltage output by the current limiter 14 is applied directly to the dummy load 18. The current flowing through the dummy load 18 is then regulated by the current regulator 24. The electrical load through which a controlled current is required is depicted in FIG. 1 as the unregulated load 20 which is connected in parallel to the dummy load 18. The regulated voltage at the output of the current limiter 14 is connected to the voltage monitor 22. The current regulator 24 is controlled by the current control input 26 which provides for the current regulation. In addition, the current regulator 24 is connected to the current monitor 28.

Figure 2:
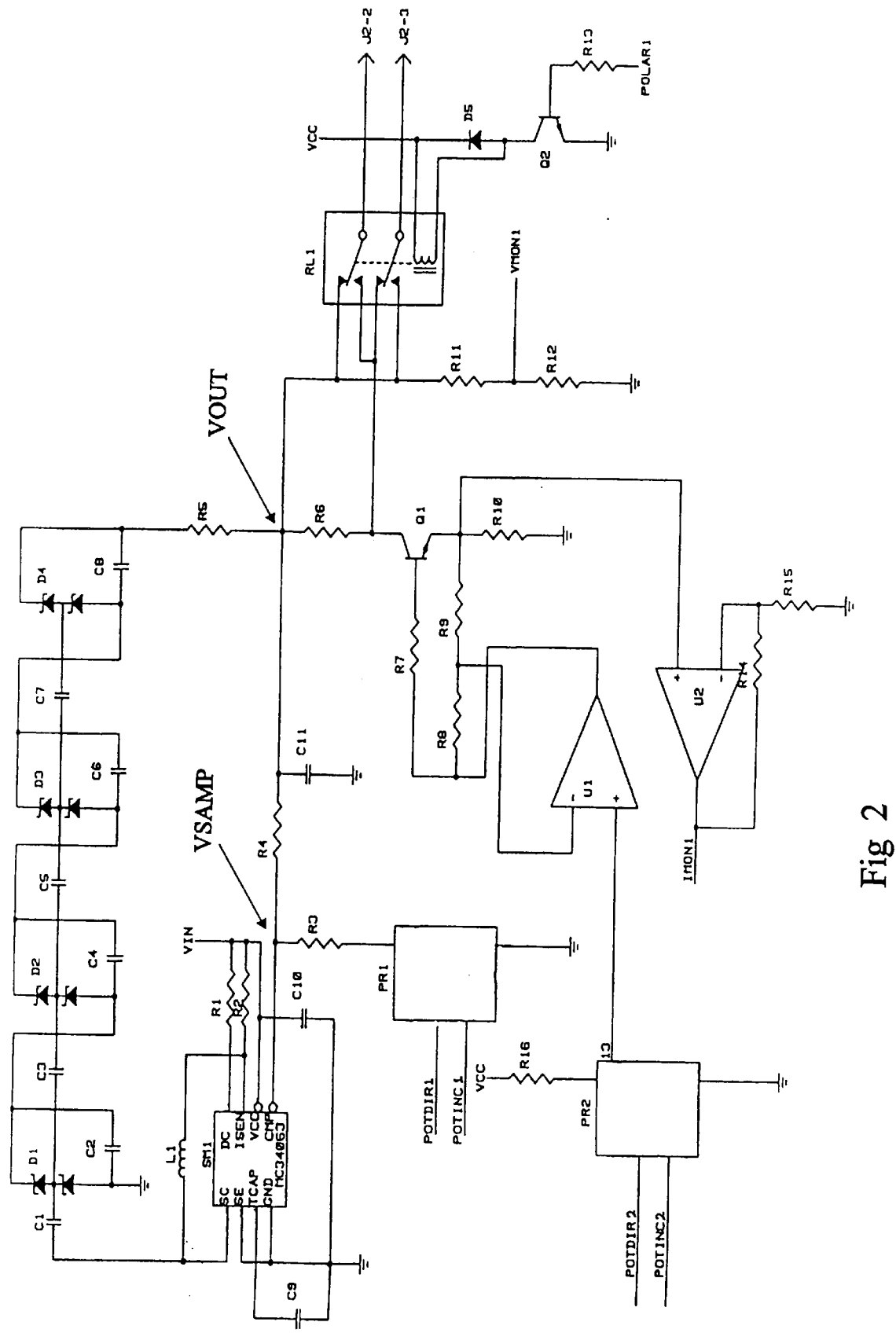
FIG. 2 is a circuit diagram detailing a paticular embodiment of the invention.

FIG. 2 details a circuit diagram which comprises a Motorola MC34063 (SM1) which is a switch mode control device specifically designed for conventional power supply applications. The switch mode control device (SM1) is designed to convert a DC input voltage into a different regulated DC output voltage.

An input voltage (VIN) is supplied to the switch mode control device (SM1) and is directly connected to pin VCC of the device (SM1). In addition, the input voltage (VIN) is also connected to pins DC and ISEN of the device (SM1) through resistors R1 and R2 respectively.

This particular embodiment of the invention uses the greater than/positive voltage configuration of the switch mode control device (SM1) and accordingly the DC output voltage (VOUT) of the device (SM1) is proportional to the mark to space ratio of a switching signal the time constants of which are related to the Inductor L1, capacitors C9 and C10, and resistors R1 and R2. In this invention the switching signal is applied directly to the voltage doubler chain, formed by capacitors C1 to C8, and the dual zener diode configurations D1 to D4.

Whilst the switch mode control device (SM1) is rated to provide a maximum voltage of 48 volts, the connection of the voltage doubler chain (C1 to C8, D1 to D4) enables the circuit to generate, and regulate output voltages (VOUT) far in excess of the maximum rated voltage of the switch mode control device (SM1).

The switch mode control device (SM1) requires that a sampled voltage (VSAMP) from the output voltage (VOUT) be equal to 1.25 volts which is the value of the internal voltage reference for SM1. This voltage is applied to the CMP pin of device (SM1). If the voltage at the CMP pin of device SM1 exceeds 1.25 volts the output voltage will be decreased, and vice versa.

In this embodiment of the invention the sampled voltage (VSAMP) is measured after R5, which is a current limiting resistor. This is done to ensure that the desired driver voltage appears at the load, without being influenced by the current flowing through R5. Regulation of the output voltage (VOUT) is effected by applying the output voltage VOUT to a voltage divider comprising resistors R4, R3 and PR1 which in this embodiment is a digitally controlled potentiometer. Device PR1 comprises two signal lines POTDIR1 and POTINC1 which indicate to the digital potentiometer the direction of resistance transition (POTDIR1) and the extent to which the resistance should be altered (POTINC1) respectively. The sampled voltage (VSAMP) is filtered by R5 and C11.

The combination of R3, R4 and PR1 can be selected to give the required range of voltage adjustment. PR1 varies the combined resistance of R3 and PR1, thus controlling the divide ratio of the voltage divider, and enabling modification of the sampled voltage VSAMP and hence the output voltage VOUT.

Since the output voltage VOUT can be changed rapidly a number of voltage waveforms may be produced at VOUT. The choice of component values must be based upon the requirements of the waveforms required to be generated. For example, R5 and C11 form a filter, which limits the maximum voltage output frequency, thus these components must be selected to allow the desired range of frequency and voltage to be produced. The voltage doubler chain also has a similar filtering effect.

The circuit comprising relay RL1, diode D5, transistor Q2 and resistor R13 is an optional polarity reversal circuit. Some applications may require that the direction of current flow be reversed periodically, or under given conditions. When a control signal (POLAR1) is applied to the base of Q2, via R13, Q2 conducts, causing the relay to energise. It should be noted that solid state relays, or other polarity reversal methods are possible. If polarity reversal is not required, the output of the circuit is available at J2-2 and J2-3. Assuming that polarity has not been switched, J2-2 will be at the voltage determined by the voltage regulation circuit with respect to the circuit ground reference, while J2-3 will be at a voltage determined by the current regulation circuit.

The potential divider circuit R11 and R12 allows a proportional sample of the output voltage (VMON1) to be measured externally. A microprocessor may use this signal (VMON1) for numerous reasons including for example system calibration, skin resistance measurement or load variation feedback.

R6 provides a current path when there is no load connected between J2-2 and J2-3. This enables a soft start facility, and prevents the circuit overdriving when the load is removed The circuit comprising transistor Q1, operational amplifier U1, and resistors R7, R8, R9 and R10 is a current regulation circuit. When current is flowing through transistor Q1, there will be a voltage drop across the sensing resistor R10. This voltage is applied to the differential amplifier circuit U1, and resistor R8 and R9, where it is compared to a reference voltage applied to the positive input of operational amplifier U1. The output from device U1 is proportional to the difference between the voltages applied to the positive and negative inputs of device U1. This output signal is applied to the base of Q1 via R7, where it controls the conductivity of Q1. Thus varying the effective total resistance in the current path, and causing the current through resistor R6 and the load connected across R6, to be regulated in accordance with the control voltage at the positive input of device U1. The voltage at J2-3 will vary such that the current flow through the load will be constant.

The operational amplifier U2, and the resistors R14 and R15 form an amplifier which is used to amplify the voltage at the junction of the transistor Q1 emitter and R10. This increases the dynamic range of the signal, the amplified version of which appears as IMON1. This signal may be used for example to calibrate the current regulation circuit or for monitoring the circuit response.

The current regulation control voltage, applied to the positive input of U1 is provided by a potential divider formed by resistors R16 and PR2. PR2 is a digitally controlled potentiometer and direct electrical connection between pin 13 of PR2 and the positive input of operational amplifier U1 provides the reference voltage input from the divider chain formed by resistor R16 and PR2. Again, it should be noted that this potential divider chain may be manually controlled, microprocessor controlled, or could be replaced by an alternative circuit, such as a digital to analogue converter. As for device PR1, digital potentiometer PR2 in this embodiment also comprises two control signals namely POTDIR2 and POTINC2 for the same purpose as detailed for device PR1.

As has been previously noted, the control of the voltage and current can be provided manually or by microcontroller or it can even be provided by means of an analogue to digital converter. The microcontroller control option offers the greatest flexibility, since the invention has the capability of producing outputs ranging from a fixed level DC voltage up to waveforms whose frequency and complexity is limited only by the maximum frequency allowable by the components of the specific implementation. A complete design may use many software algorithms for displaying information, entering information, monitoring the system, generating alarms, and providing security.

Algorithms for the control of the current and voltage levels, and those which perform automatic calibration routines have been provided in pseudocode form as follows. Performing AUTO-CALIBRATION comprises the following steps:

1) Place a known high stability load across the instrument probes.
2) Connect a calibrated microampere meter in series with the high stability load.
3) Monitor the voltage at the junction of R5 and R6 with a calibrated Volt meter.
4) Measure the voltages at the junctions of resistors R8 and R9 and resistors R7 and R8 with a calibrated Volt meter.
5) Place system into calibrate mode and activate calibration.
6) At each voltage setpoint record the actual voltage, and enter this into a program calibration table.
7) Repeat for all desired setpoints.
8) At each current setpoint measure the voltages at the junction of resistors R8 and R9 and at the junction of resistors R7 and R8 and record in amplifier calibration table.
9) Measure voltage across resistor R6 and the load, enter this into calibration table
10) Measure and record current flowing through the load.
11) When complete the microprocessor calculates as follows:
12) Actual voltage at setpoint if measured is stored else find next highest setpoint stored subtract next lowest setpoint stored.

subtract low setpoint actual voltage from high setpoint actual voltage calculate actual voltage step per setpoint step for each unstored setpoint between high and low calculate and store:

low setpoint voltage + voltage step per setpoint step * number of steps 13) repeat this until all voltage setpoints are calculated.

14) display an alarm if an abnormal voltage is detected, such as a decrement in voltage as setpoint is incremented. Enable user to accept anomaly or repeat procedure.
15) For each current setpoint calculate voltage gain of amplifier as (voltage at junction R7/R8 divided by voltage at junction R8/R9).
16) Calculate average gain and standard deviation.
17) If maximum deviation in gain exceeds desired precision enable user to accept or repeat or abort.
   else store the amplifier average gain
18) Create a table of current setpoint versus actual current.
19) Perform the interpolation/store procedure in step 12 and step 13 until completed.

Further algorithms may be developed which enable various aspects of the voltage and current signals to be individually controlled, namely base frequency, duty cycle, peak amplitude, low amplitude, positive phase period, negative phase period, pulse leading edge rise time, pulse trailing edge fall time, amplitude envelope type (for example none, ramp, sawtooth, polynomial function or sinusoid), envelope ramprate, envelope decayrate, pulse type (for example dc, square/composite, sinusoid or external) and runtime.

An example operational algorithm comprises the following steps:
21) Wait until program sequence is selected
22) From program sequence extract following information in relation to voltage and current:
   Absolute peak amplitude
   Steps to peak amplitude
   Time in clock ticks per cycle
   Clock ticks between each step
   Set all to zero if external control option is selected
23) Wait for program start signal
24) If program start signal received then continue
   else if program abort signal received then exit
   else if activity timer expires then exit
25) If external control option selected then goto label XX
26) Initialise voltage waveform interval timer
27) Initialise current waveform interval timer
28) Wait for interval timer to expire
29) Calculate pulse output value for this time sequence
30) Calculate envelope output for this time sequence
31) Modify pulse output by envelope output
32) Send value to control means (for example DAC or digital potentiometer)
33) If run timer has expired then exit
   else goto step 28)
label XX
41) Initialise A/D converter input to read external analogue input signal.
42) If run timer has expired then exit
   else wait for A/D conversion
43) Convert external signal.
44) Translate to control signal
45) Send control signal to control means
46) Goto step 42)

This invention provides a controllable voltage, which is regulated with respect to system ground, and independently regulates the current flowing through a load circuit to system ground. Since the voltage and current can be controlled separately, the circuit is able to produce, within circuit componentry limitations, many different voltage or current waveforms and can vary the voltage supplied to the load and the current flowing through the load independently and simultaneously.

Addition of a microprocessor for the purpose of providing the control signals for the generation of desired voltage and current waveforms provides a high level of flexibility in the application of electrical signals to an electrical load. This has a beneficial result, particularly in the field of sports medicine, wherein the apparatus can be tuned with a high degree of versatility to specific nerves or groups of nerves to trigger specific muscle contractions. In addition, the reduction in physical size of the unit resulting from the avoidance of using a transformer allows this apparatus to be produced in a portable package suitable for attachment to the body. This aspect is of particular significance to the use of the invention during normal daily activities or during training sessions for athletes.

We claim:
1. An electrical signal supply apparatus comprising:
   (a) voltage control circuitry for applying a voltage to an electrical load to produce an electrical current through the electrical load, wherein the electrical load comprises skin tissue; and
   (b) current control circuitry having a variable electrical impedance, the current control circuitry for electrical coupling in series with the electrical load for sensing the electrical current passing through the electrical load and for adjusting the variable electrical impedance based on the sensed electrical current to maintain a relatively constant electrical current passing through the electrical load.
2. The apparatus of claim 1, wherein the current control circuitry comprises a programmable processor for controlling the variable electrical impedance of the current control circuitry.
3. The apparatus of claim 1, wherein the voltage control circuitry comprises a current limiter for restricting current drawn from the apparatus.
4. The apparatus of claim 1, wherein the voltage control circuitry comprises voltage doubler circuitry for increasing the voltage applied to the electrical load.
5. The apparatus of claim 1, comprising polarity reversal circuitry for reversing current flow through the electrical load.
6. The apparatus of claim 1, comprising another electrical load for electrical coupling in parallel with the electrical load.
7. The apparatus of claim 1, wherein the apparatus comprises a pair of probes electrically coupled to the voltage control circuitry and to the current control circuitry for applying current through the skin tissue.
8. The apparatus of claim 1, wherein the voltage control circuitry has a variable electrical impedance for setting the voltage applied to the electrical load.
9. The apparatus of claim 8, wherein the voltage control circuitry comprises a programmable processor for controlling the variable electrical impedance of the voltage control circuitry.
10. The apparatus of claim 1, the voltage control circuitry for sensing the voltage applied to the electrical load and for adjusting the voltage applied to the electrical load based on the sensed voltage.
11. The apparatus of claim 10, wherein the voltage control circuitry comprises switch mode for outputting a voltage signal for the electrical load, the switch mode control circuitry for sampling the voltage applied to the electrical load and for adjusting the output voltage signal based on the sampled voltage.
12. The apparatus of claim 10, wherein the voltage control circuitry comprises a voltage divider for dividing the voltage sensed by the voltage control circuitry, the voltage divider having a variable electrical impedance for adjusting the sensed voltage such that the voltage control circuitry adjusts the voltage applied to the electrical load.

13. An electrical signal supply apparatus comprising:
    (a) voltage control means for applying a voltage to skin tissue to produce an electrical current through the skin tissue; and
    (b) current control means having a variable electrical impedance, the current control means for electrical coupling in series with the skin tissue for sensing the electrical current passing through the skin tissue and for adjusting the variable electrical impedance based on the sensed electrical current to maintain a relatively constant electrical current passing through the skin tissue.

14. The apparatus of claim 13, wherein the current control means comprises programmable electronic computation means for controlling the variable electrical impedance of the current control means.

15. The apparatus of claim 13, wherein the voltage control means comprises means for increasing the voltage applied to the skin tissue.

16. The apparatus of claim 13, wherein the voltage control means comprises variable impedance means for setting the voltage applied to the skin tissue.

17. The apparatus of claim 16, wherein the variable impedance means comprises programmable electronic computation means for controlling the variable impedance means.

18. The apparatus of claim 13, the voltage control means for sensing the voltage applied to the skin tissue and for adjusting the voltage applied to the skin tissue based on the sensed voltage.

19. The apparatus of claim 18, wherein the voltage control means comprises switching regulator means for outputting a voltage signal for the skin tissue, the switching regulator means for sampling the voltage applied to the skin tissue and for adjusting the output voltage signal based on the sampled voltage.

20. The apparatus of claim 18, wherein the voltage control means comprises means for dividing the voltage sensed by the voltage control means, the voltage dividing means comprising variable impedance means for adjusting the sensed voltage such that the voltage control means adjusts the voltage applied to the skin tissue.

21. An electrical signal supply apparatus comprising:
    (a) voltage control circuitry for applying a voltage to an electrical load to produce an electrical current through the electrical load; and
    (b) current control circuitry having a variable electrical impedance, the current control circuitry for electrical coupling in series with the electrical load for sensing the electrical current passing through the electrical load and for adjusting the variable electrical impedance based on the sensed electrical current to maintain a relatively constant electrical current passing through the electrical load,
    wherein the voltage control circuitry has a variable electrical impedance for setting the voltage applied to the electrical load, and
    wherein the voltage control circuitry comprises a programmable processor for controlling the variable electrical impedance of the voltage control circuitry.

22. An electrical signal supply apparatus comprising:
    (a) voltage control circuitry for applying a voltage to an electrical load to produce an electrical current through the electrical load; and
    (b) current control circuitry having a variable electrical impedance, the current control circuitry for electrical coupling in series with the electrical load for sensing the electrical current passing through the electrical load and for adjusting the variable electrical impedance based on the sensed electrical current to maintain a relatively constant electrical current passing through the electrical load,
    wherein the current control circuitry comprises a programmable processor for controlling the variable electrical impedance of the current control circuitry.

* * * * *